(12) United States Patent
Lin et al.

(10) Patent No.: US 9,122,908 B2
(45) Date of Patent: Sep. 1, 2015

(54) REAL-TIME PEOPLE COUNTING SYSTEM USING LAYER SCANNING METHOD

(71) Applicant: National Chiao Tung University, Hsinchu (TW)

(72) Inventors: Daw-Tung Lin, New Taipei (TW); Dong-Han Jhuang, Keelung (TW)

(73) Assignee: National Chiao Tung University, Hsinchu (TW)

( * ) Notice: Subject to any disclaimer, the term of this patent is extended or adjusted under 35 U.S.C. 154(b) by 352 days.

(21) Appl. No.: 13/663,645

(22) Filed: Oct. 30, 2012

(65) Prior Publication Data

US 2014/0071242 A1    Mar. 13, 2014

(30) Foreign Application Priority Data

Sep. 7, 2012    (TW) .............................. 101132893 A (51) Int. Cl.
*H04N 13/02* (2006.01)
*G06K 9/00* (2006.01)
*G06T 7/20* (2006.01)

(52) U.S. Cl.
CPC .......... *G06K 9/00201* (2013.01); *G06T 7/2053* (2013.01); *G06T 2207/10016* (2013.01); *G06T 2207/10028* (2013.01); *G06T 2207/10048* (2013.01); *G06T 2207/20036* (2013.01); *G06T 2207/30196* (2013.01); *G06T 2207/30242* (2013.01)

(58) Field of Classification Search
CPC ............ G07C 9/00; G06T 2207/30242; G06T 2207/30232; G06K 9/00167
USPC ............................................ 348/46, 143, 152
See application file for complete search history.

(56) References Cited

U.S. PATENT DOCUMENTS

| | | | |
|---|---|---|---|
| 5,866,887 A * | 2/1999 | Hashimoto et al. | 235/98 R |
| 6,987,885 B2 * | 1/2006 | Gonzalez-Banos et al. | 382/192 |
| 7,382,895 B2 * | 6/2008 | Bramblet et al. | 382/103 |
| 7,623,674 B2 * | 11/2009 | Nichani et al. | 348/47 |
| 2004/0153671 A1 * | 8/2004 | Schuyler et al. | 713/201 |
| 2006/0187120 A1 * | 8/2006 | Ohba et al. | 342/454 |
| 2009/0167857 A1 * | 7/2009 | Matsuda et al. | 348/143 |
| 2013/0136307 A1 * | 5/2013 | Yu et al. | 348/46 |

(Continued)

OTHER PUBLICATIONS

Hernandez et. al., People counting with re-identification using depth cameras, 4th International Conference on Imaging for Crime Detection and Prevention 2011, Nov. 3-4, 2011, pp. 1-6.*

(Continued)

*Primary Examiner* — Jay Patel
*Assistant Examiner* — Francis G Geroleo
(74) *Attorney, Agent, or Firm* — The Webb Law Firm (57) ABSTRACT

Disclosed herein is a method for counting the number of the targets using the layer scanning method. The steps of this method includes constructing a background frame, filtering the noise of foreground frame and classifying the targets, and screening the area of targets based on layer scanning to calculate the number of targets by determining the highest positions of the respective targets. In addition, the dynamic numbers of targets are calculated using algorithm. Accordingly, the present invention is beneficial in automatically, effectively and precisely calculating the number of the targets in/out a specific area, achieving the flow control for targets and reducing artificial error upon calculation.

7 Claims, 5 Drawing Sheets

(56) References Cited

U.S. PATENT DOCUMENTS

2013/0156273 A1\* 6/2013 Nielsen .......................... 348/234
2014/0139633 A1\* 5/2014 Wang et al. ..................... 348/46

OTHER PUBLICATIONS

Lal et. al., Noise Removal Algorithm for Images Corrupted by Additive Gaussian Noise, International Journal of Recent Trends in Engineering, vol. 2, No. 1, Nov. 2009.\*
Chen et. al., Recursive Erosion, Dilation, Opening, and Closing Transforms, IEEE Transactions on Image Processing, vol. 4, No. 4, Mar. 1995.\*
Zhang et. al., Water Filling: Unsupervised People Counting via Vertical Kinect Sensor, 2012 IEEE Ninth International Conference on Advanced Video and Signal-Based Surveillance.\*
Lin et. al., A Novel Layer-Scanning Method for Improving Real-Time People Counting.\*

\* cited by examiner

Fig. 4a
First loop

Fig. 4b
Second loop

Fig. 4c
Third loop

Fig. 4d
nth loop

REAL-TIME PEOPLE COUNTING SYSTEM USING LAYER SCANNING METHOD

The application claims the benefit of Taiwan Patent Application No. 101132893, filed on Sep. 7, 2012, in the Intellectual Property Office of Republic of China, the disclosure of which is incorporated by reference as if fully set forth herein.

FIELD OF THE INVENTION

The present invention relates to a method for calculating the number of objects, especially relates to a layer scanning method for calculating the number of the objects such as human or other things.

BACKGROUND OF THE INVENTION

It is important to calculate the number of the objects within a certain regional space to manage the objects. If the number of people in the entrances and exits of come locations, such as stations, stores, department stores and concerts, can be real-timely calculated, it is helpful to monitor and control the crowds timely in these locations so as to reduce the concern of the fire security. For example, calculating the livestock at the entrance channel in the animal farm is helpful to manage the movement of the livestock. For another example, calculating the finished or semi-finished products through a specific gateway at the product manufacturing line in the factory is helpful to manage the production of the product.

In general, the statistics of the population flow can be applied in an enclosed area and an open area. The calculated device usually configures at the entrance and the exit of the enclosed area such as a library, a museum, an exhibition center, a store, a public transportation, etc. It is typically difficult to accurately estimate the population for the open area such as a parade, an election rally field, a night market, a square, etc. The population density of a small area is usually calculated by taking an aerial photograph and then estimating the number of the people in the large-scale specific area according to the aerial photograph.

For people counting as an example, a radar sensor, a color camera, an ultrasonic sensor and an infrared sensor can detect the number of people entering and leaving a regional space, except determining the number of the crowd one-by-one artificially by the naked eye. The radar sensor uses a Doppler effect to detect moving objects, to estimate the moving rate and direction of the objects by transmitting and receiving the frequency of the electromagnetic of the radar sensor, and then to calculate the number and the flow of the objects via the received wavelength and frequency. However, the disadvantage of the radar sensor is that it is not easy to calculate the number of the objects accurately when the number of crowd is too many. Although the color camera has smaller masking effect when the two or more objects closing to each other and can also calculate the number of more objects passing through the detecting area at the same time, it is easily affected by the changes of the ambient light, which causes the captured foreground data being incorrect, thereby affecting the correctness of the counting results. The infrared sensor and the ultrasonic sensor can not count the objects correctly when the objects are too much or the appearance of a shelter. Therefore, it is important to improve the counting of the objects number in the regional space for managing the objects and the regional space.

It is therefore attempted by the applicant to deal with the above situation encountered in the prior art.

SUMMARY OF THE INVENTION

In order to overcome the disadvantage of the various instruments in the prior art, the present invention uses an infrared depth sensor and supplemented by the detection method to provide a real-time layer scanning method, and counts the number of the objects through the regional space to enhance the accuracy of the counting objects. Furthermore, the technique of the present invention is not affected by the changes of the ambient light which can effectively reduce the interference of the background.

The present invention provides a method for counting a number of objects in a regional space, including steps of: constructing a background model, deriving foreground depth map, filtering noise, connecting the objects, layer scanning, filtering the objects area, tracking and analyzing the objects, and counting the number of the objects.

In a calculating a total number of objects in a space by an infrared depth sensor process, and the infrared depth sensor is configured above the space and shoots downward, and at least one depth range of the space is defined, the process includes a step of using the infrared depth sensor to shoot N frames in a time period and averaging the N frames to obtain a background depth map. The N is a natural number. When at least one of the objects appear in the space, the infrared depth sensor shoots a $(N+1)^{th}$ frame. A loop method is used to scan every pixel of the background depth map and every pixel of the $(N+1)^{th}$ frame according to the at least one depth range. The pixels of the $(N+1)^{th}$ frame different from the corresponding pixels of the background depth map are extracted to construct a first foreground depth map. At least one first erosion, at least one dilation and at least one second erosion is used to eliminate a noise of the first foreground depth map, and to obtain a second foreground depth map. A plurality of pixels of the second foreground depth map are classified and marked. The adjacent ones of the plurality of pixels are classified into the same set. The marked plurality of pixels of the second foreground depth map is reclassified to obtain the total number of the object.

In a calculating a total number of objects process in a space, the process includes a step of making a background depth map and a sample depth map for the space. A foreground depth map is obtained by subtracting the sample depth map by the background depth map. The total number of the objects contained in the foreground depth map is calculated according to an identifying condition.

In a calculating a total number of objects process in a region, the process includes a step of providing at least one foreground map. The total number of the objects contained in the at least one foreground map is calculated according to an identifying condition based on one of respective highest heights of the objects and respective areas of the highest height of the objects.

Other objects, advantages and efficacy of the present invention will be described in detail below taken from the preferred embodiments with reference to the accompanying drawings, in which:

EXPERIMENTAL MATERIALS AND METHODS

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

The present invention uses a Kinect® sensor which is a peripheral device of an Xbox 360 developed by Microsoft©. The Kinect® sensor has three camera lenses, the middle camera lens is a RGB color camera, and the both side camera lenses respectively are an infrared transmitter and an infrared complementary metal-oxide-semiconductor (CMOS) camera which composing a 3D light depth sensor. When the Kinect® sensor sets levelly, the visual range is 57° of the horizontal viewing angle and 43° of the vertical viewing angle, and the stereo-visual depth is between 122-350 cm. The present invention uses the Kinect® 3D light depth sensor to obtain a depth map, and superadds a novel layer scanning technique to accurately determine the number of the objects. However, the skilled persons all understand that the light depth sensor having the infrared function includes but does not limit to the Kinect® sensor or the Xtion® Pro sensor (a product of ASUS). As long as the sensor has the characteristics aforementioned, it can be applied to the present invention.

Figure 1:
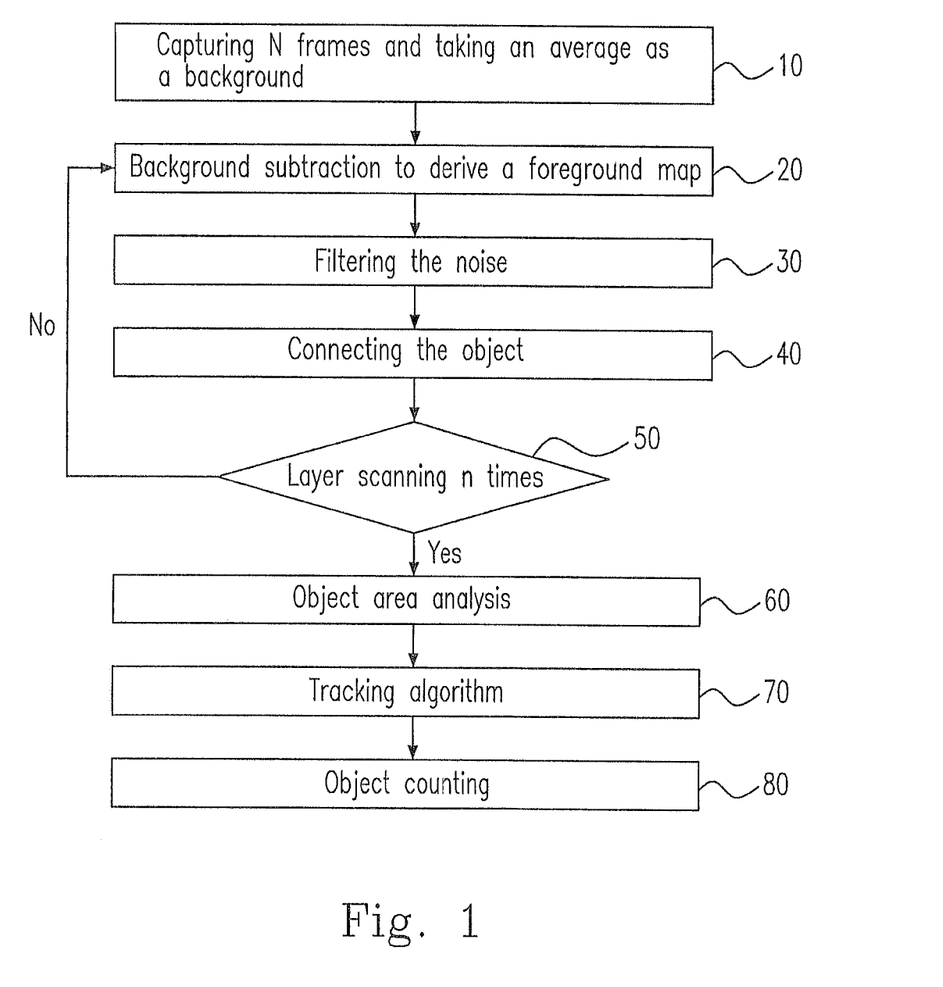
FIG. 1 of the present invention shows a flow chart of objects counting method.

FIG. 1 is a flow chart for objects counting method in accordance with the present invention. The step 10 in FIG. 1 "capturing N frames and taking an average as a background map" which means an infrared depth sensor is configured above a space and shoots downwardly, and at least one depth range of the space is defined. Taking the average of the N frames captured by the infrared depth sensor to construct a background model, where N is a natural number and the natural number is a positive integer. In some embodiments, the Kinect® sensor is disposed at a position about 1.8 meters to 3.5 meters from the ground, and the lens of the Kinect® sensor downwardly shoots 100 frames of the space depth maps and averages the 100 frames as a background. An ordinarily skilled person in the art understands that the height of the sensor depends on the actual space limitation, and the number of the space depth map is not limited to 100 frames. After a time interval, the space depth map can be re-shot and recalculated to obtain a new background map. An openNI library has been used to get the depth information and openCV has been used to transform the type from depth information to accessible one, and a huge holder set above the main door in the social building first door.

Next, the step 20 "background subtraction to derive a foreground map" which means shooting a $(N+1)^{th}$ frame where objects appears and comparing with the background map constructed in step 10 pixel by pixel. If there are differences between the pixels of the $(N+1)^{th}$ frame and the pixels of the background map, the pixels different from the corresponded pixels of the background map are extracted from the $(N+1)^{th}$ frame to construct a first foreground depth map. The background will be updated every 100000 frames to clear unwanted objects who entering the view when constructing the background map.

Next, the step 30 "filtered a noise" which means a noise of the first foreground depth map is removed. For example, the first foreground depth map has 1 object, but it may be determined there are 2 objects because of the noise which causing the distortion of the counting result. The present invention uses a combination of an erosion and a dilation to eliminate the noise of the first foreground depth map to obtain a second foreground depth map. The erosion and the dilation method are described as follows.

Figure 2A:
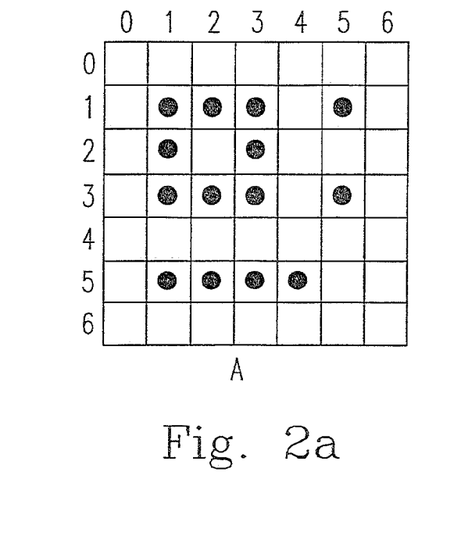
FIG. 2a of the present invention shows a pixel location schematic diagram of a foreground depth map.
Figure 2B:
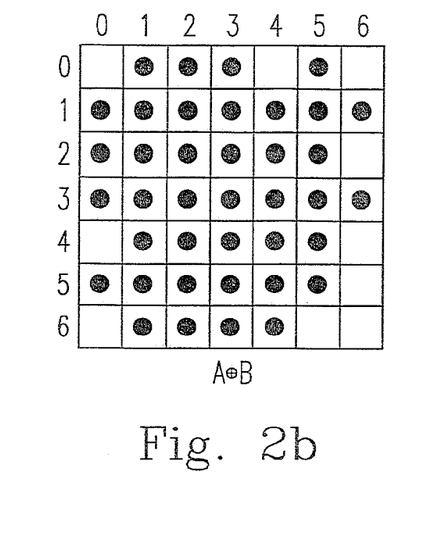
FIG. 2b of the present invention shows a schematic diagram of a dilation of the pixel FIG. 2a according to a cross-shaped mask.

FIGS. 2a, 2b and 2c are continued schematic diagrams of the dilation and the erosion for the pixel in the foreground depth map to eliminate the noise by a cross-shaped mask. The cross-shaped mask is a region surrounded by a selected pixel and four pixels located at an upper side, a lower side, a left side and a right side of the selected pixel. The steps of the dilation and the erosion are described as follows: in FIG. 2a, the horizontal axis is an x axis, the vertical axis is a y axis, and each grid is a coordinate. For example, the coordinates (1,1) and (1,2) are pixel locations in the foreground depth map. When the foreground depth map is scanned by the cross-shaped mask for proceeding a dilation, a specific pixel (1,1) of the foreground depth map is selected by the center of the cross-shaped mask, but the coordinates (1,0) and (0,1), which are two of the four neighbored pixels of the specific pixel, do not completely covered by the cross-shaped mask, then the coordinates (1,0) and (0,1) are filled with pixels (referring to FIG. 2b, the pixel black spots of the coordinates (1,0) and (0,1)).

Figure 2C:
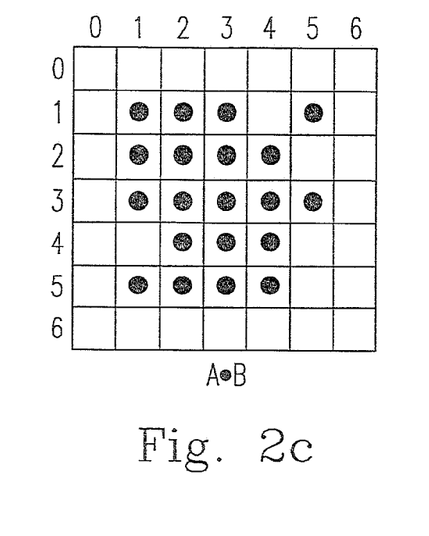
FIG. 2c of the present invention shows a schematic diagram of an erosion of the pixel FIG. 2b according to a cross-shaped mask.

Similarly, the specific pixel (1,2) of the foreground depth map is selected by the center of the cross-shaped mask, but the coordinates (2,2) and (0,2), which are the two of the four pixels, do not completely covered by the cross-shaped mask, then the coordinates (2,2) and (0,2) are filled with pixels. When the cross-shaped mask scans the foreground depth map one by one, the erosion will be occurred while the five points covered by the cross-shaped mask all belong to the foreground depth map, then the center pixel will be retained, and the rest four pixels are eliminated (referring to FIG. 2b to FIG. 2c). For example, when the erosion occurs, the specific pixel (1,5) of the foreground depth map is selected by the center of the cross-shaped mask, and the coordinates (1,4), (0,5), (1,6) and (2,5), which are the four neighbored pixels of the specific pixel (1,5), are completely covered by the cross-shaped mask, then the specific pixel (1,5) is retained, and the rest four neighbored pixels, (1,4), (0,5), (1,6) and (2,5), are eliminated (referring to FIG. 2c, the pixel black spots of the coordinates (1,4), (0,5), (1,6) and (2,5)). Accordingly, the erosion and the dilation can moderately filter out the noise and avoid separating one object into two objects.

In some embodiments, the foreground depth map is respectively proceeded the erosion for three times, the dilation for six times and the re-erosion for three times. The skilled person in the art who refers to this article can arbitrarily adjust the number of times and the sequence of the erosion or the dilation, or only proceed with the erosion or the dilation.

Continuing directing to FIG. 1, the step 40 "connecting the objection" means that classifying and marking all plurality of pixels of the foreground depth map and assembling the pixels adjacent to each other, and connecting the objects which may be separated together into complete objects. The method is described as follows: scanning the foreground depth map from left to right and from top to down.

Figure 3A:
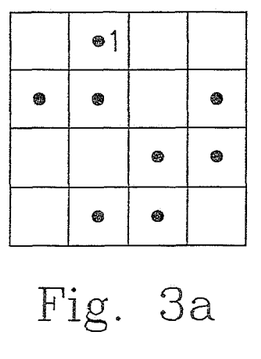
FIGS. 3a to 3f of the present invention show schematic diagrams of objects connecting method.
Figure 3B:
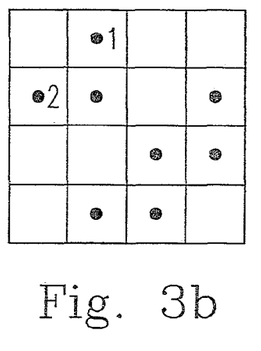
Figure 3C:
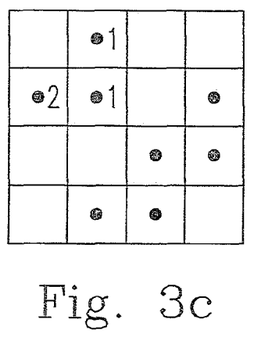
Figure 3D:
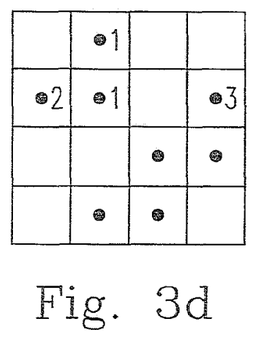
Figure 3E:
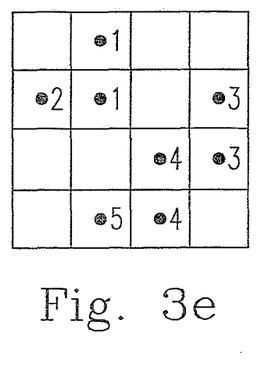
Figure 3F:
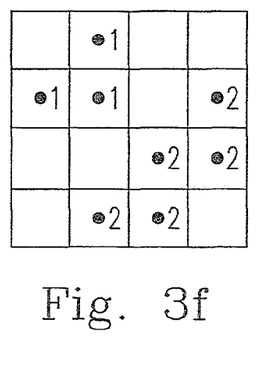

For example, as shown in FIG. 3a, when scanning to the first row, the first appeared pixel is given a number 1; the second appeared pixel is given a number 2, and so on. When scanning to the second row, if there is not any labeled pixel above a new pixel, then continuing label the new pixel, such as the number 2 and the number 3 in FIGS. 3b and 3d. When there is a labeled pixel above the new pixel, then labeling the new pixel with the number same as the labeled pixel above thereof, such as the number 1 in the second line of the second row in FIG. 3c. Similarly, the same thing is true of scanning the third row to the last row, as shown in FIG. 3e. Finally, as shown in FIG. 3f, classifying and marking the adjacent pixels to obtain an actually number of the objects appeared in the foreground depth map. There are two objects in the example of FIG. 3.

Referring back to FIG. 1, the step 50 "layer scanning n times" means that the step 20 to step 40 of the method will be repeated n times to multilayer scan the different depth region by the depth sensor. For example, when the depth sensor is configured at 3 meters upper the ground, the depth sensor can be set to shoot downward and capture the depth map between 1-2 meters upper the ground. The range of 1-2 meters moderate region is divided into different sub-ranges, and the depth sensor shoots each sub-range to obtain different depth maps, then calculating the possible objects in each sub-range according to the steps 20-40.

The step 60 "object area analysis" means that using a condition to analyze the objects area. According to the result of the steps 20-40, a preliminary result which is not comply with a preset condition will be discarded, and the steps 20-40 will repeat n times until there is a condition comply with the preset condition, then continued to analyzed the area. The steps of this method are as follows: firstly, giving a predefined area to the objects. When the number of the at least one depth range of the preprocessed foreground depth map is larger than 1, repeating the steps 20-40 and supersposing the plurality of processed foreground map. Comparing the predefined area with the plurality of processed foreground map to screen the processed foreground map having the objects complied with the predefined area, and summing up the number of the objects.

Figure 4A:
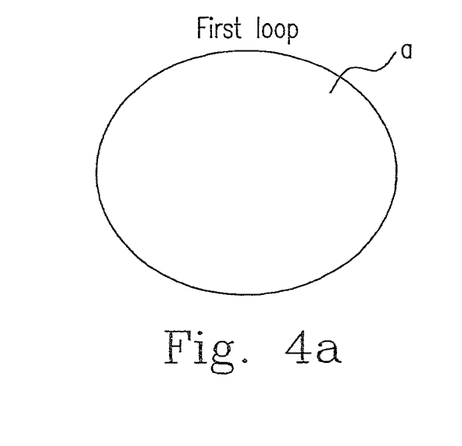
FIGS. 4a to 4d of the present invention show a schematic diagram of screening and superposing the area by a condition.
Figure 4B:
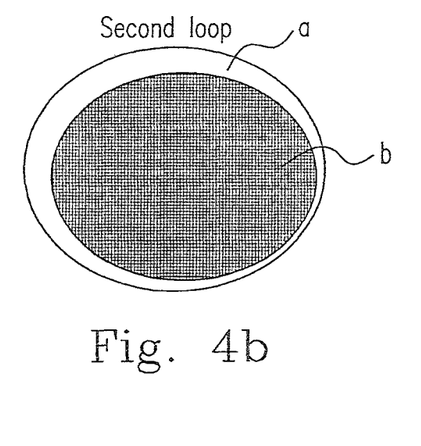
Figure 4C:
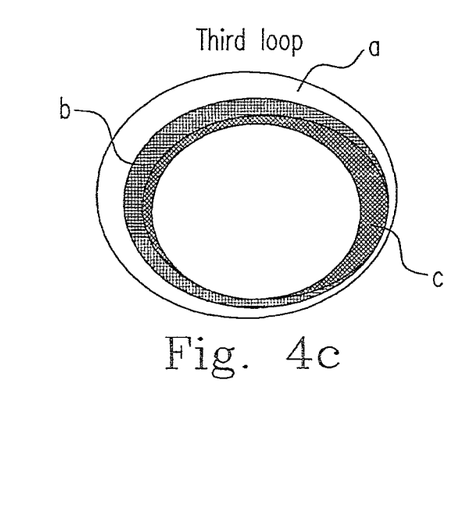
Figure 4D:
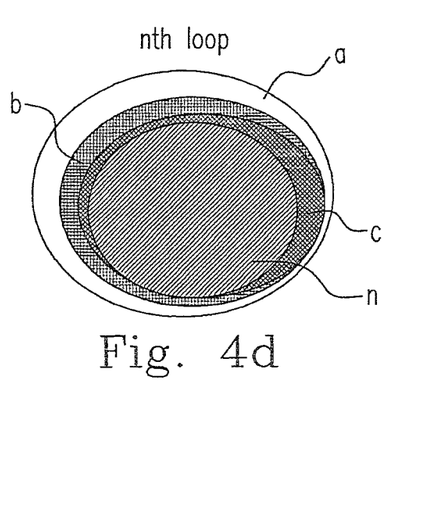

In some embodiments, a first loop scanned by the first scan is shown in FIG. 4a. The range a is the depth range of the knee to the foot of a human, the foreground depth map thereof has a darker grayscale value. A second loop scanned by the second scan is shown in FIG. 4b. The range b is the depth range of the waist to the knee of the human. A third loop scanned by the third scan is shown in FIG. 4c. The range c is the depth range of the chest to the waist of the human. An nth loop scanned by the nth scan is shown in FIG. 4d. The range n is the depth range of the head to the chest of the human. Since the head of the human is closer to the sensor, the lighter of the foreground depth map captured by the sensor will be obtained. Superposing the obtained foreground depth maps respectively, and removing the discrepant area to obtain a highest height portion, the range n, thereby determining the highest position of the object is the range n.

Referring back to FIG. 1, the step 70 "tracking algorithm" and the step 80 "object counting" mean that the objects adjacent to each other are reclassified to obtain the number of the objects. Comparing the two continuous foreground depth map and selecting the shortest distance for pairing. In order to compare objects in a current frame and a previous frame, the use of data structure is inevitable.

Figure 5A:
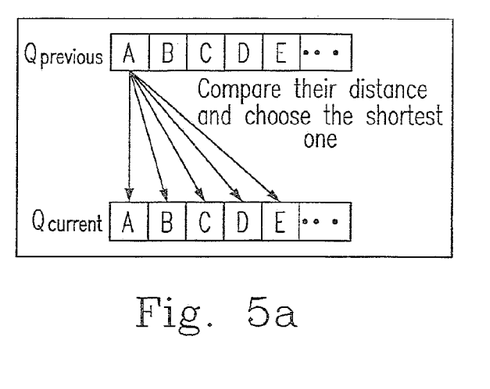
FIGS. 5a to 5d of the present invention show a schematic diagram of a tracking and an analyzing method.
Figure 5B:
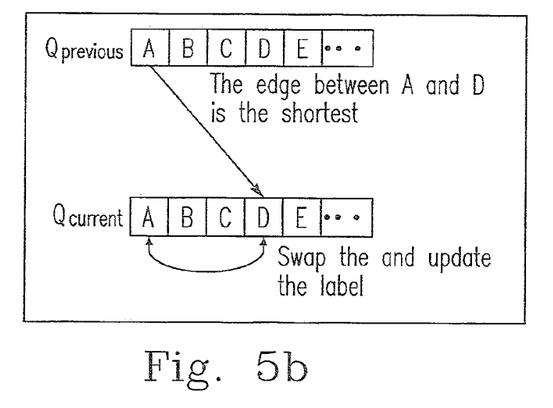
Figure 5C:
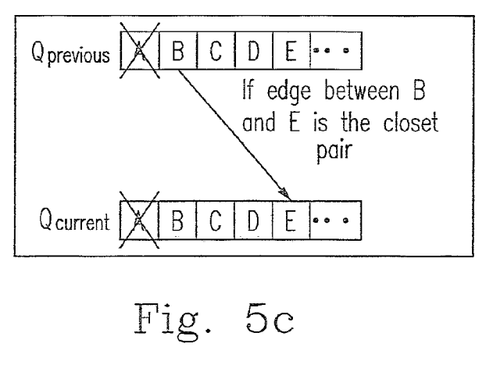

As shown in FIG. 5a, comparing the shortest distance between the objects of the previous foreground depth map having the object numbers A-E ($Q_{previous}$) and the current foreground depth map having the object numbers A-E ($Q_{current}$), wherein the previous frame is for objects coming from the previous frame and the current frame is for new coming objects. As shown in FIG. 5b, there are 5 objects in the $Q_{previous}$ and 5 objects in the $Q_{current}$. When the object A of the $Q_{previous}$ has the shortest distance with the object D of the $Q_{current}$, the label A and the label D in the $Q_{current}$ will be swapped, then the label D change into label A and the label A change into label D, then the label A of the $Q_{previous}$ and the label A of the $Q_{current}$ are paired completely. This intended to the same object has the same label number. Similarly, as shown in FIG. 5c, the object A of $Q_{previous}$ has paired completely.

Figure 5D:
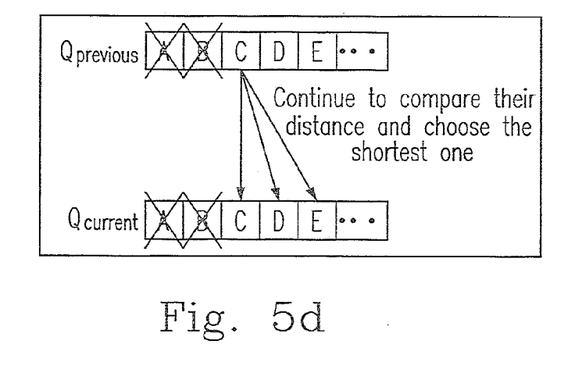

Continued paring the object B of the $Q_{previous}$ with the objects B-E in the $Q_{current}$. It is found that the object B of the $Q_{previous}$ has a shortest distance with the object E of the $Q_{current}$, so that the object B of the $Q_{current}$ is swapped with the object E of the $Q_{current}$ and re-labeling the object E into label B and the object B into the label E, then the label B of the $Q_{previous}$ and the label B of the $Q_{current}$ are paired completely, as shown in FIG. 5d. Finally, analyzing the number of the object which is paired completely. Therefore, using the same objects with the same labels and different objects with the different labels can count the number of the objects. Furthermore, it is possible to produce two situations that the objects cannot be paired. In the first case, the objects number of the $Q_{current}$ is more than the objects number of the $Q_{previous}$. For example, there are 3 objects in the $Q_{current}$ after calculating by the algorithm, but the $Q_{previous}$ only has 1 object, this means that there are 2 objects never be detected into the sensor field by the infrared depth map with counting time. In the second case, the objects number of the $Q_{current}$ is less than the objects number of the $Q_{previous}$. For example, there is 1 object in the $Q_{current}$ after calculating by the algorithm, but the $Q_{previous}$ has 3 objects, this means that there are 2 objects leave the sensor field with counting time. Owing to the depth information and the process of loop, the process can track each object even if the objects are too close.

There are further embodiments provided as follows.

Embodiment 1

In a calculating a total number of objects in a space by an infrared depth sensor process, and the infrared depth sensor is configured above the space and shoots downward, and at least one depth range of the space is defined, the process includes a step of using the infrared depth sensor to shoot N frames in a time period and averaging the N frames to obtain a background depth map. The N is a natural number. When at least one of the objects appear in the space, the infrared depth sensor shoots a $(N+1)^{th}$ frame. A loop method is used to scan every pixel of the background depth map and every pixel of the $(N+1)^{th}$ frame according to the at least one depth range. The pixels of the $(N+1)^{th}$ frame different from the corresponding pixels of the background depth map are extracted to construct a first foreground depth map. At least one first erosion, at least one dilation and at least one second erosion are used to eliminate a noise of the first foreground depth map, and to obtain a second foreground depth map. A plurality of pixels of the second foreground depth map are classified and marked. The adjacent ones of the plurality of pixels are classified into the same set. The marked plurality of pixels of the second foreground depth map is reclassified to obtain the total number of the object.

Embodiment 2

In the calculating the total number of the objects process according to the above-mentioned embodiment 1, each of the objects has a predefined area.

Embodiment 3

In the calculating the total number of the objects process according to the above-mentioned embodiment 2, the process further includes a step of repeating the steps (c)-(e) to obtain and superpose a plurality of processed foreground depth maps. The plurality of the processed foreground depth maps are compared with the predefined area to determine whether each of the objects complied with the predefined area is configured at the highest portion to screen the processed foreground depth maps having at least one of the objects complied with the predefined area. The total number of the objects configured at the highest portion is summed up.

Embodiment 4

In the calculating the total number of the objects process according to the above-mentioned embodiment 1, the process further includes a step of scanning the pixels of the first foreground depth map based on a cross-shaped mask. The cross-shaped mask is a region composed of a selected pixel and four pixels respectively located at an upper side, a lower side, a left side and a right side of the selected pixel.

Embodiment 5

In the calculating the total number of the objects process according to the above-mentioned embodiment 4, the cross-shaped mask has 4 blanks, each of which is to be occupied by a specific pixel. The process further includes a step of retaining the selected pixel when the at least one first erosion and the at least one second erosion occur if the cross-shaped mask is filled up with the selected pixel and the four pixels belonging to the foreground depth map. The cross-shaped mask is filled up by specific pixels when the at least one dilation occurs if the cross-shaped mask is not fully filled up with the selected pixel and the four pixels of the foreground depth map.

Embodiment 6

In the calculating the total number of the objects process according to the above-mentioned embodiment 1, the plurality of pixels are counted from left to right and from top to down are sequentially from a first pixel to a $(m+1)^{th}$ pixel, where m is a natural number no less than 2. The process further includes a step of marking the first pixel, the m pixel and the $(m+1)^{th}$ pixel as having value 1, value m and value $(m+1)$. When there is a pixel above the $m^{th}$ pixel, the value of the $m^{th}$ pixel is equal to that of the pixel thereabove and the value of the $(m+1)^{th}$ pixel is the value of the pixel preceding the $m^{th}$ pixel plus 1. The pixels with the same value belong to the same set.

Embodiment 7

In the calculating the total number of the objects process according to the above-mentioned embodiment 6, the process further includes a step of reclassifying the respective sets into groups with respective parameters from 1 to p. P is a natural number no less than 1. The parameter p is used to represent the total number of the objects.

Embodiment 8

In a calculating a total number of objects process in a space, the process includes a step of making a background depth map and a sample depth map for the space. A foreground depth map is obtained by subtracting the sample depth map by the background depth map. The total number of the objects contained in the foreground depth map is calculated according to an identifying condition.

Embodiment 9

In the calculating the total number of the objects process in a space according to the above-mentioned embodiment 8, the background depth map is shot by an infrared depth sensor.

Embodiment 10

In the calculating the total number of the objects process in a space according to the above-mentioned embodiment 9, the infrared depth sensor is configured above the space and shoots downward.

Embodiment 11

In the calculating the total number of the objects process in a space according to the above-mentioned embodiment 8, the process includes a step of filtering out a noise of the foreground depth map.

Embodiment 12

In the calculating the total number of the objects process in a space according to the above-mentioned embodiment 11, the noise is filtered out by at least one first erosion, at least one dilation and at least one second erosion.

Embodiment 13

In the calculating the total number of the objects process in a space according to the above-mentioned embodiment 12, the process includes a step of scanning the pixels of the foreground depth map based on a cross-shaped mask. The cross-shaped mask is a region composed of a selected pixel and four pixels respectively located at an upper side, a lower side, a left side and a right side of the selected pixel.

Embodiment 14

In the calculating the total number of the objects process in a space according to the above-mentioned embodiment 13, the cross-shaped mask has 4 blanks. Each of which is to be occupied by a specific pixel. The process includes a step of retaining the selected pixel when the at least one first erosion and the at least one second erosion occur if the cross-shaped mask is filled up with the selected pixel and the four pixels belonging to the foreground depth map. The cross-shaped mask is filled up by specific pixels when the at least one dilation occurs if the cross-shaped mask is not fully filled up with the selected pixel and the four pixels of the foreground depth map.

Embodiment 15

In the calculating the total number of the objects process in a space according to the above-mentioned embodiment 8, the identifying condition provides an area condition for the objects. The process includes a step of recognizing a height of each object in the foreground depth map according to the area condition.

Embodiment 16

In a calculating a total number of objects process in a region, the process includes a step of providing at least one foreground map. The total number of the objects contained in the at least one foreground map is calculated according to an identifying condition based on one of respective highest heights of the objects and respective areas of the highest height of the objects.

Embodiment 17

In the calculating the total number of the objects process in a space according to the above-mentioned embodiment 16, the region is located within a sensing range of an infrared depth sensor.

Embodiment 18

In the calculating the total number of the objects process in a space according to the above-mentioned embodiment 16, the respective highest heights are the highest portions of the respective objects after superposing the at least one foreground map.

Embodiment 19

In the calculating the total number of the objects process in a space according to the above-mentioned embodiment 16, the process includes a step of filtering out a noise of the foreground depth map.

While the invention has been described in terms of what is presently considered to be the most practical and preferred embodiments, it is to be understood that the invention needs not be limited to the disclosed embodiments. Therefore, it is intended to cover various modifications and similar configuration included within the spirit and scope of the appended claims, which are to be accorded with the broadest interpretation so as to encompass all such modifications and similar structures.

What is claimed is:

1. A method for calculating a total number of objects in a space by an infrared depth sensor, wherein the infrared depth sensor is configured above the space and shoots downward, and at least one depth range of the space is defined, the method comprising steps of:
 (a) using the infrared depth sensor to shoot N frames in a time period and averaging the N frames to obtain a background depth map, where the N is a natural number;
 (b) shooting a $(N+1)^{th}$ frame where at least one of the objects appear;
 (c) using a loop method to scan every pixel of the background depth map and every pixel of the $(N+1)^{th}$ frame according to the at least one depth range, and extracting the pixels of the $(N+1)^{th}$ frame different from the corresponding pixels of the background depth map to construct a first foreground depth map;
 (d) using at least one first erosion, at least one dilation and at least one second erosion to eliminate a noise of the first foreground depth map, and to obtain a second foreground depth map;
 (e) classifying and marking a plurality of pixels of the second foreground depth map, wherein adjacent ones of the plurality of pixels are classified into the same set; and
 (f) reclassifying the marked plurality of pixels of the second foreground depth map to obtain the total number of the objects;

wherein each of the objects has a predefined area and when a total number of the at least one depth range is larger than 1, the steps (c)-(e) are repeated to obtain and superpose a plurality of processed foreground depth maps, the plurality of the processed foreground depth maps are compared with the predefined area to determine whether each of the objects complying with the predefined area is configured at the highest portion to screen the processed foreground depth maps having at least one of the objects complying with the predefined area, and the total number of the objects configured at the highest portion is summed up.

2. The method according to claim 1, wherein the step (d) further comprises a step of scanning the pixels of the first foreground depth map based on a cross-shaped mask, wherein the cross-shaped mask is a region composed of a selected pixel and four pixels respectively located at an upper side, a lower side, a left side and a right side of the selected pixel.

3. The method according to claim 2, wherein the cross-shaped mask has 4 blanks, each of which is to be occupied by a specific pixel, and the step (d) further comprises steps of retaining the selected pixel when the at least one first erosion and the at least one second erosion occur if the cross-shaped mask is filled up with the selected pixel and the four pixels belonging to the foreground depth map, and of filling the cross-shaped mask up by specific pixels when the at least one dilation occurs if the cross-shaped mask is not fully filled up with the selected pixel and the four pixels of the foreground depth map.

4. The method according to claim 1, wherein the plurality of pixels of the step (e) counted from left to right and from top to down are sequentially from a first pixel to a $(m+1)^{th}$ pixel, where m is a natural number no less than 2, the step (e) further comprises: (e1) marking the first pixel, the m pixel and the $(m+1)^{th}$ pixel as having value 1, value m and value (m+1), wherein when there is a pixel above the $m^{th}$ pixel, the value of the $m^{th}$ pixel is equal to that of the pixel thereabove and the value of the $(m+1)^{th}$ pixel is the value of the pixel preceding the $m^{th}$ pixel plus 1, and the pixels with the same value belong to the same set.

5. The method according to claim 4, wherein the step (f) further comprises steps of: (f1) reclassifying the respective sets into groups with respective parameters from 1 to p, where p is a natural number no less than 1; and (f2) using the parameter p to represent the total number of the objects.

6. A method for calculating a total number of objects in a space, comprising steps of:
 making a background depth map and a sample depth map for the space, wherein the background depth map is shot by an infrared depth sensor and the infrared depth sensor is configured above the space and shoots downward;
 subtracting the sample depth map by the background depth map to obtain a foreground depth map;
 filtering out a noise of the foreground depth map by at least one first erosion, at least one dilation and at least one second erosion, wherein the filtering step is performed by scanning the pixels of the foreground depth map based on a cross-shaped mask, the cross-shaped mask is a region including a selected pixel and four pixels respectively located at an upper side, a lower side, a left side and a right side of the selected pixel, the cross-shaped mask has 4 blanks, each of which is occupied by a specific pixel, when the at least one first erosion and the at least one second erosion occur and the cross-shaped mask is filled up with the selected pixel and the four pixels belonging to the foreground depth map, the selected pixel is retained, and when the at least one dilation occurs and the cross-shaped mask is not fully filled up with the selected pixel and the four pixels of the foreground depth map, the cross-shaped mask is filled up by specific pixels; and calculating the total number of the objects contained in the foreground depth map according to an identifying condition.

7. The method according to claim 6, wherein the identifying condition provides an area condition for the objects, and the calculating step further comprises a step of recognizing a height of each object in the foreground depth map according to the area condition.

* * * * *